US008434108B2

(12) United States Patent
Tsai

(10) Patent No.: US 8,434,108 B2
(45) Date of Patent: Apr. 30, 2013

(54) HOST COMPUTER WITH TV MODULE AND TV PROGRAM DISPLAYING METHOD

(75) Inventor: Teng-Yu Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 120 days.

(21) Appl. No.: 13/210,565

(22) Filed: Aug. 16, 2011

(65) Prior Publication Data

US 2012/0188455 A1    Jul. 26, 2012

(30) Foreign Application Priority Data

Jan. 20, 2011 (TW) .............................. 10102107 A

(51) Int. Cl.
*G06F 3/00* (2006.01)
*G06F 13/00* (2006.01)

(52) U.S. Cl.
USPC ................................ 725/43; 725/51; 725/60

(58) Field of Classification Search ................ 725/43, 725/51, 60
See application file for complete search history.

(56) References Cited

U.S. PATENT DOCUMENTS

| 5,774,664 | A | * | 6/1998 | Hidary et al. ................. 725/110 |
| 8,104,068 | B2 | * | 1/2012 | Shiomi ......................... 725/152 |
| 2007/0124796 | A1 | * | 5/2007 | Wittkotter ..................... 725/136 |
| 2010/0146544 | A1 | * | 6/2010 | Aoki et al. ...................... 725/37 |

* cited by examiner

*Primary Examiner* — Hunter B Lonsberry
(74) *Attorney, Agent, or Firm* — Altis Law Group, Inc.

(57) ABSTRACT

A host computer includes a first virtual machine, a second virtual machine, a host display, and a virtual machine monitor. The first virtual machine includes a television module and a first display window. The second virtual machine includes a browser module and a second display window. The host display is used for displaying the first display window and the second display window. The virtual machine monitor is used for displaying a television program by virtue of the television module in the first display window when the television module is activated, and displaying a forum page of a forum website corresponding to the television program by means of the browser module in the second display window. The forum page includes a plurality of relevant comments.

9 Claims, 5 Drawing Sheets

HOST COMPUTER WITH TV MODULE AND TV PROGRAM DISPLAYING METHOD

BACKGROUND

1. Technical Field

The present disclosure relates to computers, and particularly to, a host computer with a television module and a television program displaying method.

2. Description of Related Art

A virtual environment includes a host computer and a plurality of virtual machines working on the host computer. The host computer has a host operating system and each virtual machine has a guest operating system. Different things can be done on different virtual machines. For example, one virtual machine is used for watching television (TV), and another virtual machine must be used for viewing comments about the TV programs. However, users cannot watch TV and see comments in the same display area. If users want to see comments, they must switch to another virtual machine, which is inconvenient.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
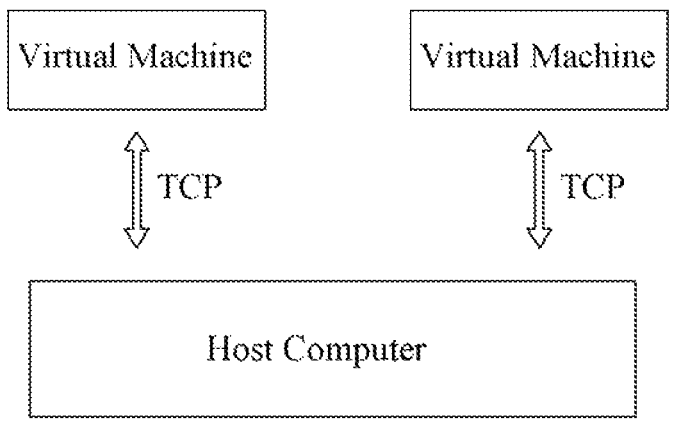
FIG. 1 is a first block diagram of an embodiment of the host computer.

Referring to FIG. 1, a virtual environment includes a host computer and a plurality of virtual machines working on the host computer. The host computer has a host operating system and each virtual machine has a guest operating system. Different virtual machines can perform different functions. For example, one virtual machine may be used for watching television (TV), and another virtual machine may be used for viewing comments about the TV programs.

Figure 2:
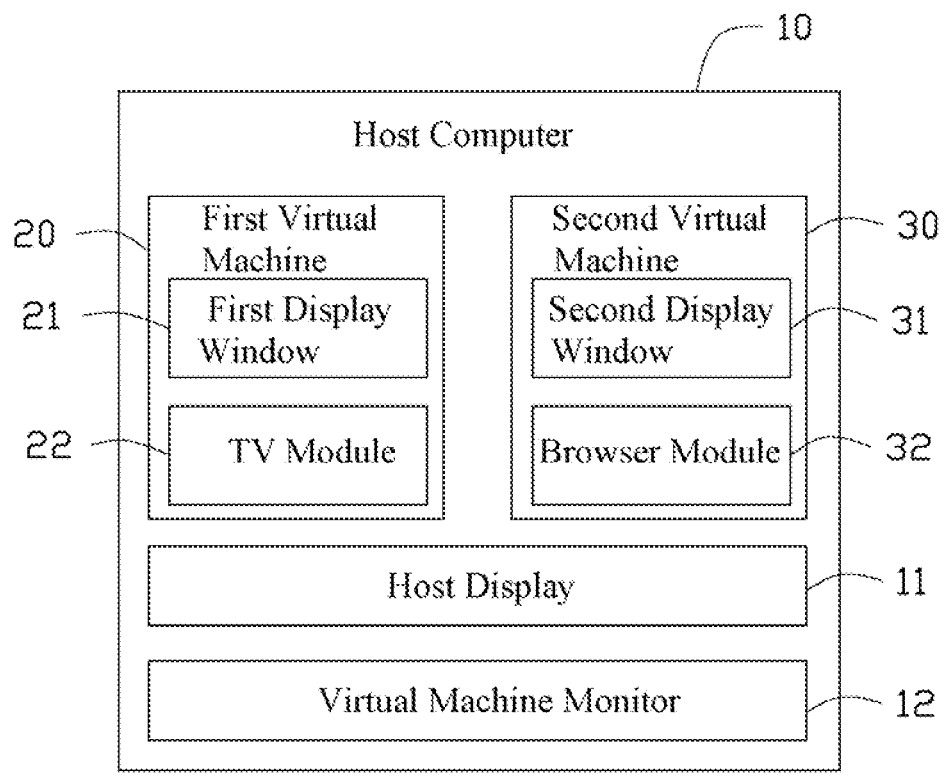
FIG. 2 is a second block diagram of an embodiment of the host computer.

Referring to FIG. 2, a first virtual machine 20 and a second virtual machine 30 interact with a host computer 10. The host computer 10 includes a host display 11 and a virtual machine monitor 12. The first virtual machine 20 includes a first display window 21. A first application is installed in the first virtual machine 20. In one embodiment, the first application is a TV module 22. The second virtual machine 30 includes a second display window 31. A second application is installed in the second virtual machine 30. In one embodiment, the second application is a browser module 32. The first display window 21 and the second display window 31 are configured to be displayed on the host display 11. A display area of a first display window 21 is larger than a display area of the second display window 31.

Figure 3:
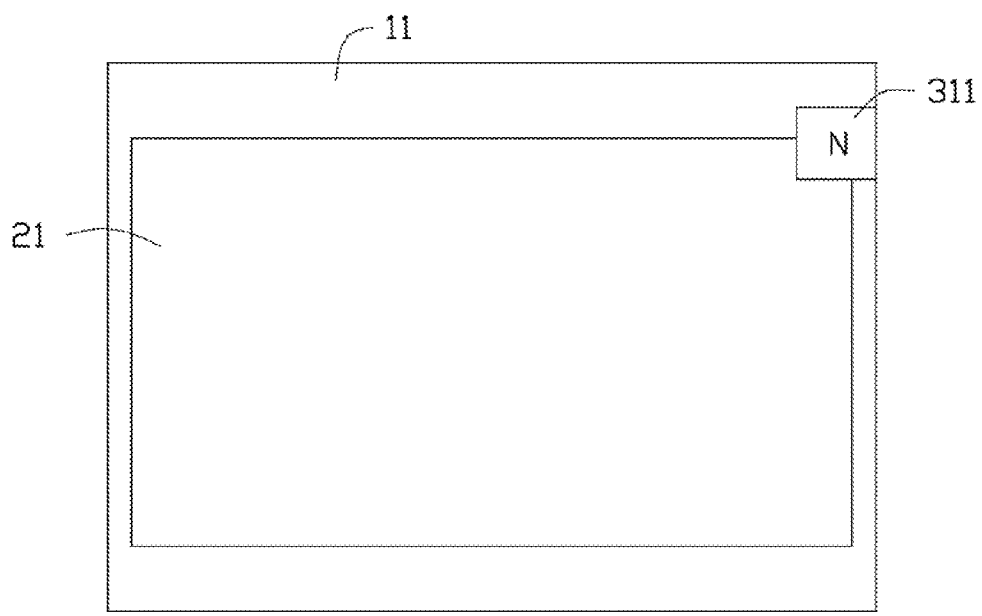
FIG. 3 is a first schematic view of an embodiment of the host computer.
Figure 4:
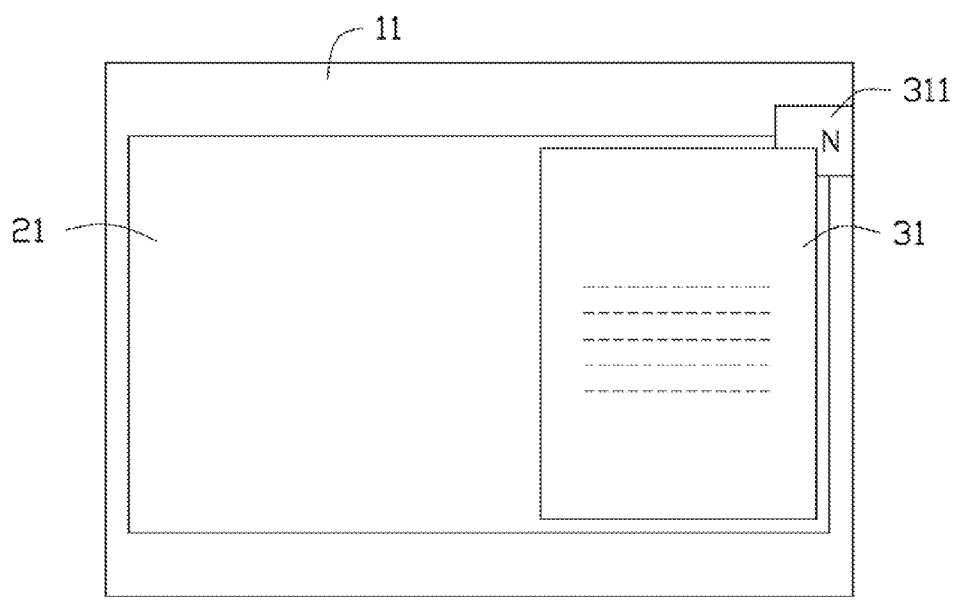
FIG. 4 is a second schematic view of an embodiment of the host computer.

Referring to FIGS. 3 and 4, the first display window 21 is displayed on a main body of the host display 11. An icon 311 corresponding to or representing the second display window 32 is also displayed on the host display 11. If the icon 311 is clicked, the second display window 32 is simultaneously displayed on the host display 11. If the icon 311 is clicked again, the second display window 32 ceases to be displayed on the host display 11.

Figure 5:
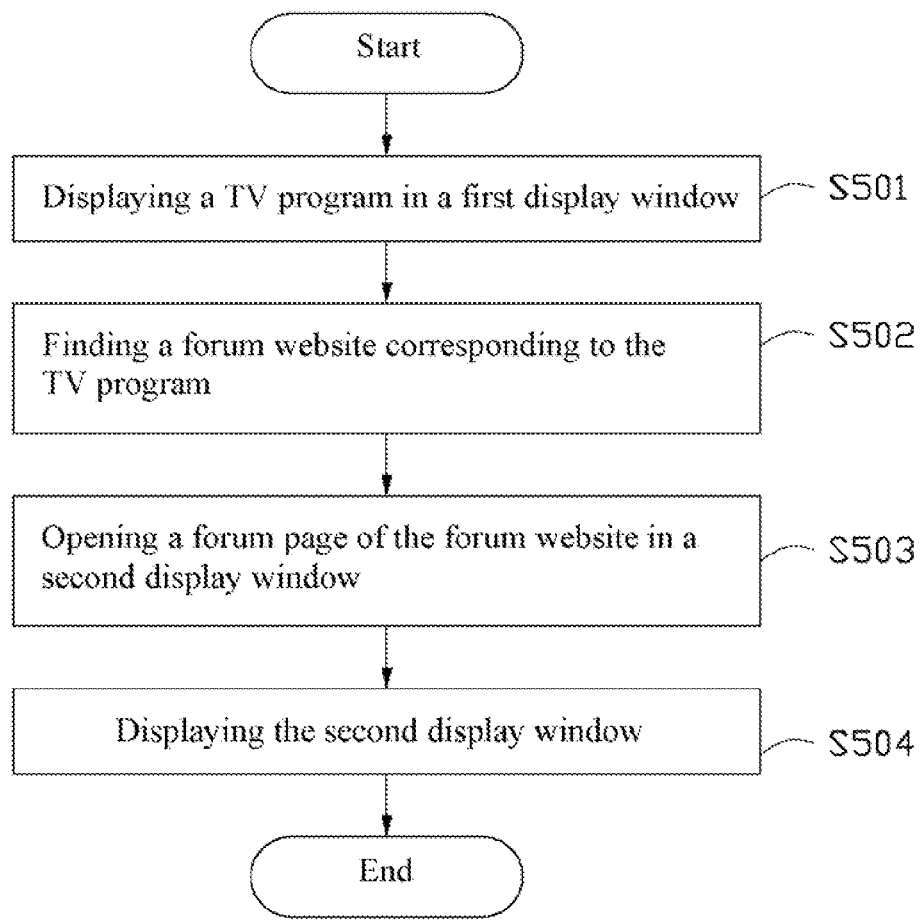
FIG. 5 is a flowchart in accordance with an embodiment of a TV program displaying method.

Referring to FIG. 5, a TV program and a comment-displaying method is shown. An embodiment of the method is as follows.

In step S501, the virtual machine monitor 12 displays a TV program on the first display window 21 when the TV module 22 is activated.

In step S502, the virtual machine monitor 12 finds a forum website corresponding to the TV program according to data in the TV channel which offers that TV program. For example, for a channel of the national basketball association (NBA), the virtual machine monitor 12 finds a forum website corresponding to an NBA game.

In step S503, the virtual machine monitor 12 opens a forum page of the forum website via the browser module 32. The forum page includes a plurality of comments, and the display of the icon 311 on the screen indicates a number of comments available for the TV program.

In step S504, the virtual machine monitor 12 displays the second window 31 on the host display 11 when the icon 311 is clicked. At this time, users can see comments corresponding to the NBA game. Users can watch the TV and see relevant comments on the host display 11 at the same time.

In the above method, through the browser module 32, the virtual machine monitor 12 finds a corresponding website when users switch to a new channel.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and the arrangement of parts within the principles of the present disclosure to the full extent indicated by the broad general meaning of the terms in which the appended claims are expressed.

Depending on the embodiment, certain of the steps of a method(s) described may be removed, others may be added, and the sequence of steps may be altered. It is also to be understood that the description and the claims drawn for a method may include some indication in reference to certain steps. However, the indication used is only to be viewed for identification purposes and not as a suggestion as to an order for the steps.

What is claimed is:

1. A host computer, comprising:
a first virtual machine comprising a television (TV) module and a first display window;
a second virtual machine comprising a browser module and a second display window;
a host display adapted to display the first display window and the second display window; and
a virtual machine monitor adapted to display a TV program of the TV module on the first display window when the TV module is activated, and display a forum page of a forum website corresponding to the TV program by opening the browser module on the second display window, the forum page comprising a plurality of relevant comments.

2. The host computer of claim 1, wherein an icon is defined in the host display corresponding to the second display window, and the virtual machine monitor is adapted to display or cease the second display window on the host display when the icon is clicked.

3. The host computer of claim 1, wherein the forum page comprises a plurality of comments and a number of the plurality of comments is displayed on the icon.

4. The host computer of claim 1, wherein a display area of a first display window is greater than a display area of the second display window.

5. A television (TV) program displaying method, applied in a host computer, the method comprising:
providing a first virtual machine, a second virtual machine, a host display, and a virtual machine monitor, the first virtual machine comprising a TV module and a first display window, the second virtual machine comprising a browser module and a second display window;
displaying a TV program of the TV module by the virtual machine monitor on the first display module;
finding a forum website corresponding to the TV program;
opening a forum page of the forum website by the virtual machine monitor; and
displaying the forum page on the second display window at the same time.

6. The TV program displaying method of claim 5, wherein an icon is defined corresponding to the second display window, and the second display window is displayed or ceased on the host display when the icon is clicked.

7. The TV program displaying method of claim 5, wherein the forum page comprises a plurality of comments and the method further comprises displaying a number of the plurality of comments on the icon.

8. The TV program displaying method of claim 5, wherein a display area of a first display window is greater than a display area of the second display window.

9. The TV program displaying method of claim 5, wherein the first display window and the second display window are displayed on the host display.

* * * * *